(12) United States Patent
Östrup et al.

(10) Patent No.: US 8,682,320 B2
(45) Date of Patent: Mar. 25, 2014

(54) METHODS AND ARRANGEMENTS FOR HANDLING A SETUP OF AN S1 APPLICATION PROTOCOL SIGNALLING CONNECTION

(75) Inventors: Peter Östrup, Linköping (SE); Stefan Engström, Linköping (SE); Peter Werner, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/516,504

(22) PCT Filed: Dec. 16, 2009

(86) PCT No.: PCT/SE2009/051436
§ 371 (c)(1),
(2), (4) Date: Jun. 15, 2012

(87) PCT Pub. No.: WO2011/075022
PCT Pub. Date: Jun. 23, 2011

(65) Prior Publication Data
US 2012/0252436 A1    Oct. 4, 2012

(51) Int. Cl.
*H04W 4/00* (2009.01)
(52) U.S. Cl.
USPC ............ 455/434; 455/435.1; 455/435.2; 455/436; 455/452.1; 455/453
(58) Field of Classification Search
USPC ........... 455/434, 435.1, 435.2, 436, 437, 438, 455/439, 452.1, 453, 454, 456.1
See application file for complete search history.

(56) References Cited

U.S. PATENT DOCUMENTS

2009/0318161 A1* 12/2009 Lopes .......................... 455/453
2010/0039991 A1*  2/2010 Godin et al. .................. 370/328
(Continued)

FOREIGN PATENT DOCUMENTS

WO    2009/045001 A     4/2009
WO    2009/135365 A1   11/2009

OTHER PUBLICATIONS

3rd Generation Partnership Project. "Collecting Mobility Statistics in Support of Configuration and Optimisation of LTE/SAE Networks." 3GPP TSG RAN WG3 Meeting #55bis, R3-070660, St. Julian's, Malta, Mar. 27-30, 2007.

(Continued)

*Primary Examiner* — Khai M Nguyen
(74) *Attorney, Agent, or Firm* — Murphy, Bilak & Homiller, PLLC (57) ABSTRACT

The invention relates to a method in a Mobility Management Entity (10,11) for handling a setup of an S1 Application Protocol signalling connection between a first radio base station and the Mobility Management Entity (10,11) in a Long Term Evolution radio communications network. The Mobility Management Entity (10,11) receives an S1 Setup Request message from the first radio base station (12). Furthermore, the Mobility Management Entity (10,11) sends an S1 Setup Response message to the first radio base station (12) enabling the first radio base station to handle the setup of the S1 Application Protocol signalling connection. The S1 Setup Response message comprises an indication of at least one supported tracking area code of a tracking area, which tracking area is served by the Mobility Management Entity (10, 11).

12 Claims, 9 Drawing Sheets

---

401
1st part 402
2nd part
(Served TACs)

(56) References Cited

U.S. PATENT DOCUMENTS

| | | | |
|---|---|---|---|
| 2010/0210288 A1* | 8/2010 | Kim et al. | 455/458 |
| 2010/0267388 A1* | 10/2010 | Olsson | 455/436 |
| 2011/0032871 A1* | 2/2011 | Xu et al. | 370/328 |
| 2011/0044309 A1* | 2/2011 | Ye et al. | 370/338 |
| 2011/0176530 A1* | 7/2011 | Vikberg et al. | 370/338 |

OTHER PUBLICATIONS

3rd Generation Partnership Project. 3GPP TS 36.413, V9.0.0 (Sep. 2009). 3rd Generation Partnership Project; Technical Specification Group Radio Access Network; Evolved Universal Terrestrial Radio Access Network (E-UTRAN); S1 Application Protocol (S1AP) (Release 9). Sep. 2009.

3rd Generation Partnership Project. 3GPP TS 36.423, V9.0.0 (Sep. 2009). 3rd Generation Partnership Project; Technical Specification Group Radio Access Network; Evolved Universal Terrestrial Radio Access Network (E-UTRAN); X2 application protocol (X2AP) (Release 9). Sep. 2009.

* cited by examiner

METHODS AND ARRANGEMENTS FOR HANDLING A SETUP OF AN S1 APPLICATION PROTOCOL SIGNALLING CONNECTION

TECHNICAL FIELD

The invention relates to a method and an arrangement in a Mobility Management Entity and a method and an arrangement in a radio base station. In particular, the present invention relates to handle a setup of an S1 Application Protocol signalling connection in a Long Term Evolution radio communications network.

BACKGROUND

In an Evolved Packet System, radio base stations (eNodeBs) are connected to Mobility Management Entities (MMEs), for control of mobile User Equipment (UE) in the network. One eNobeB may be connected to one or more MMEs. To find a UE in the network for e.g. an incoming message, the MMEs asks the eNodeBs to send paging messages in the cells. As an example, two geographically separated MMEs serving areas consisting of several tracking areas (TAs) page the UE only in one or more tracking areas where it is currently registered, to lower the paging load in the network. To enable communication between the eNodeB and the MME an S1 Application Protocol (S1-AP) signalling connection need to be setup, which is performed according to an 51 setup procedure. The S1 Setup procedure is defined in 3GPP TS 36.413 and by means of this procedure the ENodeB sets up an S1-AP signalling connection to the MME. S1-AP is an Evolved UMTS Terrestrial Radio Access Network (E-UTRAN) radio network layer signalling protocol for the S1 interface.

The S1 interface is the interface between the radio base station in the E-UTRAN and the MME in the Evolved Packet Core Network of the Evolved Packet System. The radio base stations in the E-UTRAN may communicate with one another over an X2 interface.

Different areas in the radio communications network may be served by different MMEs and the cell or cells of an eNodeB are configured with a Tracking Area Code (TAC). During the S1 Setup procedure the eNodeB includes all its broadcast TACs in an S1 Setup Request message to the MME, when initiating the S1-AP signalling connection to the MME. The S1 Setup Request message includes detected TACs. The MME has no possibility to reject certain broadcast TACs that are not served by this MME, but only to reject or accept the S1 Setup procedure as a whole. This allows the configured cells of a certain eNodeB only to be from the same geographical pool area, a singular pool area configuration and makes the cell configuration non flexible and requires signalling between MMEs.

SUMMARY

An object of present embodiments is to provide a mechanism in a Long Term Evolution radio communications network that enables signaling in an efficient and reliable manner.

In a first aspect, the object is achieved by providing a method in a Mobility Management Entity for handling a setup of an S1 Application Protocol signalling connection between a first radio base station and the Mobility Management Entity in a Long Term Evolution radio communications network. The Mobility Management Entity receives an S1 Setup Request message from the first radio base station. Furthermore, the Mobility Management Entity sends an S1 Setup Response message to the first radio base station enabling the first radio base station to handle the setup of the S1 Application Protocol signalling connection. The S1 Setup Response message comprises an indication of at least one supported tracking area code of a tracking area, which tracking area is served by the Mobility Management Entity.

In order to perform the method an arrangement in the Mobility Management Entity is provided. The arrangement comprises a receiving circuit arranged to receive an S1 Setup Request message from the first radio base station. The arrangement further comprises a sending circuit arranged to send the S1 Setup Response message to the first radio base station.

In a second aspect, the object is achieved by providing a method in the first radio base station. The first radio base station receives a configuration setup indicating a first tracking area code of a cell in the radio communications network. The first radio base station then sends the S1 Setup Request message to the Mobility Management Entity comprising the first tracking area code. The first radio base station receives the S1 Setup Response message from the Mobility Management Entity enabling the first radio base station to handle the setup of the S1 Application Protocol signalling connection. As stated above the S1 Setup Response message comprises the indication of the at least one supported tracking area code of the tracking area served by the Mobility Management Entity.

The first radio base station then compares the first tracking area code with the at least one supported tracking area code. If, the first tracking area code matches the at least one supported tracking area code, the first radio base station sets up the S1 Application Protocol signalling connection towards the Mobility Management Entity.

In order to perform the method an arrangement in the first radio base station. The arrangement comprises a receiving circuit arranged to receive the report of the first tracking area code from the user equipment present and thereby detecting the first tracking area code. The arrangement further comprises a sending network circuit arranged to send the S1 Setup Request message to the Mobility Management Entity comprising the first tracking area code. Also, the arrangement comprises a receiving network circuit arranged to receive the S1 Setup Response message from the Mobility Management Entity. In addition, the arrangement comprises a comparing circuit arranged to compare the first tracking area code with the at least one supported tracking area code, and also an S1 Application Protocol circuit arranged, if the first tracking area code matches the at least one supported tracking area code, to set up the signalling connection towards the Mobility Management Entity.

Thus, the Mobility Management Entity can reject or accept certain TACs. Embodiments herein also enables the possibility to configure radio base stations with TACs from different geographical areas making cell planning more flexible in networks that cover big geographical areas by providing the feature of adding supported TACs into the S1 setup response message. The signalling between MMEs will be reduced when cells can be individually connected to the same MME (pool) that are neighbour cells, to and from which the UEs move most. Hence, a mechanism is provided that efficiently and reliably affects the signalling in the LTE radio communications network.

BRIEF DESCRIPTION OF THE DRAWINGS

Embodiments will now be described in more detail in relation to the enclosed drawings, in which.

DETAILED DESCRIPTION

Figure 1:
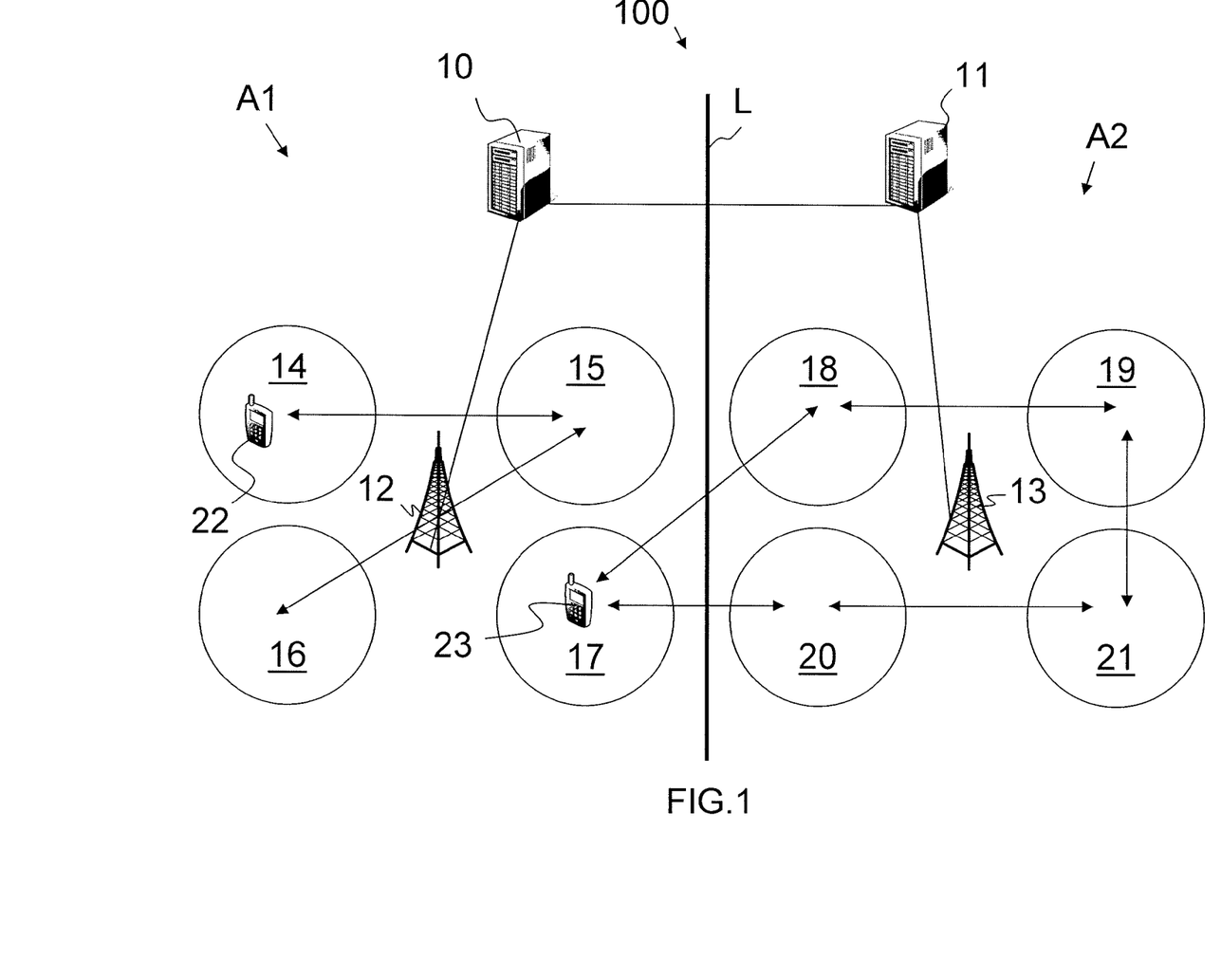
FIG. 1 is a schematic diagram of a radio communications network.

FIG. 1 shows an example of a radio communications network 100 in which the present invention is suitably applied.

In the illustrated example the radio communications network 100 comprises a first area A1 and a second area A2 separated in the figure with a line L. A1 is served by a first Mobility Management Entity (MME) 10 and A2 is served by a second Mobility Management Entity (MME) 11. It should be understood that the areas A1, A2 may also be served by a pool of MMEs. Also, the first MME 10 and the second MME 11 may be referred to as one MME 10 and another MME 11.

In the radio communications network 100, there is a controlling node, generically referred to as a "radio base station", RBS, controlling cells in the radio communications network 100. The radio communications network 100 is a Long Term Evolution (LTE) network. An RBS may be denoted as an evolved NodeB.

In A1 the first MME 10 is controlling a first radio base station 12 and in A2 the second MME 11 is controlling a second radio base station 13. As shown, the radio communications network 100 is a cellular system and the radio base stations 12, 13 serve a number of cells of different tracking area codes. In the illustrated example, the first radio base station 12 serves a first cell 14, a second cell 15, a third cell 16, and a fourth cell 17. Each of the cells 14-16 may have a first tracking area code (TAC1) allocated to each cell. A second tracking area code (TAC2) may be allocated to the fourth cell 17.

Similarly, the second radio base station 13 serves a fifth cell 18, a sixth cell 19, a seventh cell 20, and a eighth cell 21. Each of the cells 18-20 may have a third tracking area code (TAC3) allocated to each cell. A fourth tracking area code (TAC4) may be allocated to the eighth cell 21. The TACs may be allocated to the cells during configuration of the radio communications network 100 or during update of the radio communications network 100 from an Operational Support System (OSS) node or any other configuration node.

Each cell may comprise a number of user equipments, with the generic name "UE". In the illustrated example, a first user equipment 22 is present in the first cell 14 and a second user equipment 23 is present in the fourth cell 17. The arrows in the figure illustrate the movements of user equipment in the cell. That is, detected nominal movement of user equipments within the radio communications network. As indicated in the figure, the movement of user equipments within the fourth cell 17 in general is towards the fifth cell 18 and the seventh cell 21. This may be because a highway or a popular shopping street runs in this direction or something similar. In today's system, configured cells of the first radio base station 12 can only to be from the same geographical pool area, in other words, a singular pool area configuration. However, with a main mobility pattern according to the arrows in FIG. 1, it would be beneficial to allocate the TAC 3 to the fourth cell 17 served by the first radio base station 12 and let the second user equipment 23 in the fourth cell 17 to be handled by the second MME 11. The signalling of moving many user equipments back and forth between the first MME 10 and the second MME 11 would be avoided and the signalling would be more efficient.

The moving of the user equipments may be detected according to collected statistics in the OSS, the radio base station, the MME or the like. For example, by monitoring tracking update messages, handover messages or the like.

Figure 2:
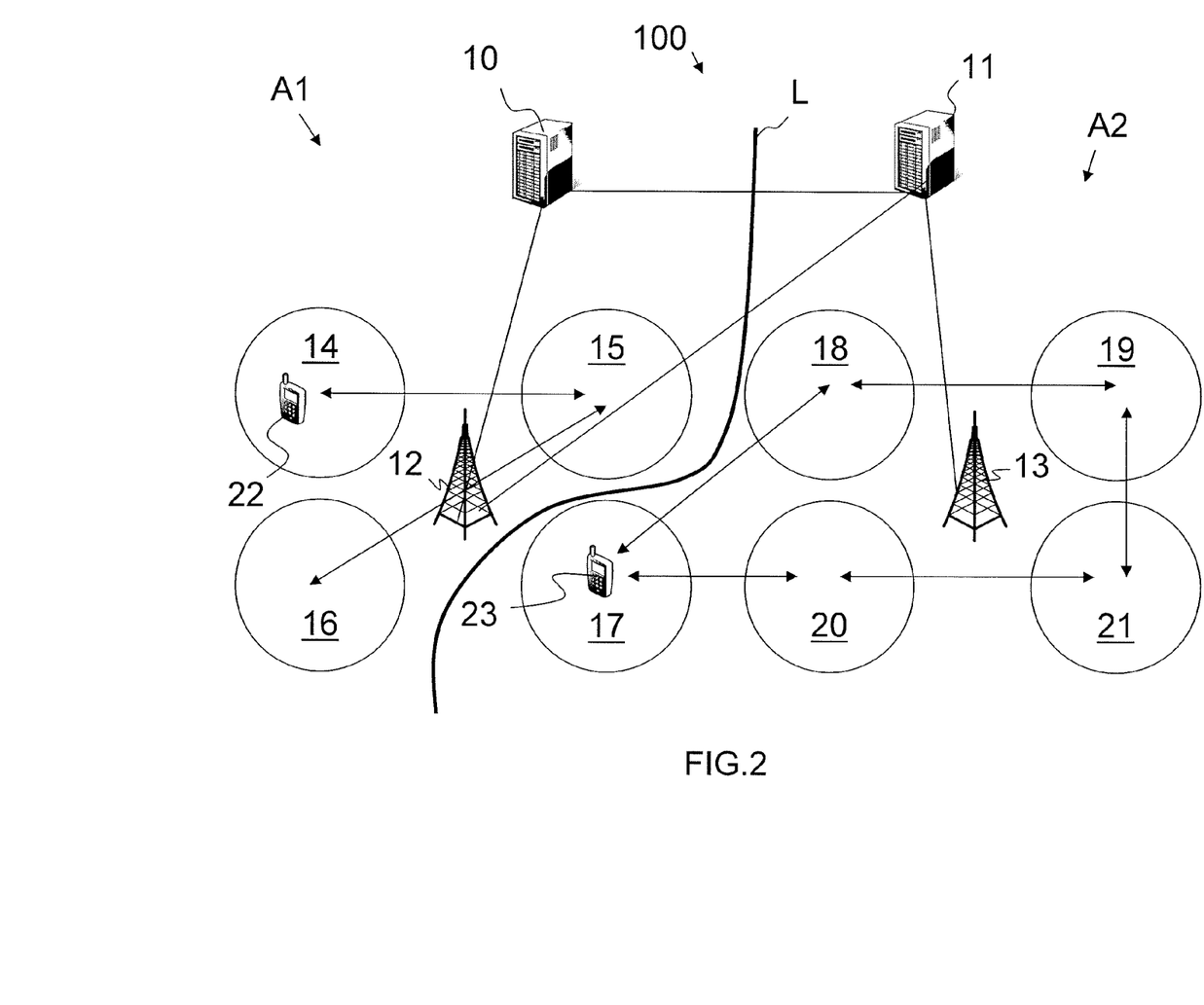
FIG. 2 is a schematic diagram of a radio communications network.

In FIG. 2, an example of the radio communications network 100 with a different configuration according to embodiments of the present solution. The radio communications network 100 comprises the A1 and the A2. A1 is served by the first MME 10 and A2 is served by the second MME 11. However, A1 comprises here the first to third cell 14-16 and A2 comprises the fourth to eighth cell 17-22 as indicated with the changed form of the line L. The TAC configured to the fourth cell 17 has changed to TAC3 instead of TAC2. Hence, the first MME 10 serves the cells 14-16 and the second MME 11 serves the cells 17-22. The TAC change may be performed by the OSS, the radio base station, the MME or the like.

For the first radio base station 12 to serve also the user equipment 23 within the fourth cell 17 the first radio base station 12 sets up an S1 connection to the controlling MMEs. The first radio base station 12 includes all its known TACs in an S1 Setup Request message to the MMEs, when initiating the radio base station to MME signalling connection. The S1 Setup Request message would here include TAC1, TAC2 and TAC3.

According to embodiments herein, the first MME 10 transmits an S1 Setup Response message comprising the TACs supported by the first MME 10 and thereby provides the possibility of the MME 10,11 to reject or accept S1 Setup procedures of only TACs that are or are not served by this MME. That is, the first radio base station 12 sends an S1 Setup Request message comprising detected TAC1, TAC2 and TAC3 to the first MME 10. The first MME 10 responds in an S1 Setup Response message comprising supported TACs, that is, TAC1 and TAC2. In addition, the first radio base station 12, from e.g. manual configuration by the OSS or by requesting a Domain Name Server node with TAC3, knows that an S1-AP signalling connection need to be setup towards the second MME 11. The first radio base station 12 sends a second S1 Setup Request message comprising an indicator of detected TAC1-TAC3 to the second MME 11. The MME 11 then responds by sending an S1 Setup Response message indicating supported TAC3.

Hence, the first radio base station sets up an S1-AP signalling connection towards the first MME 10 and an S1-AP signalling connection towards the second MME 11 serving different TACs and may store which TACs is supported by which MME. The first radio base station 12 may then communicate with both the first MME 10 and the second MME 11 and hence the signalling between the MMEs will be reduced.

It should be noted that some changes to the X2-AP protocol specification, 3GPP TS 36.423, may be implemented to better support the present solution.

When setting up a connection between the two radio base stations 12,13, a so called X2-AP signaling connection, there is a Global Unique Group Identity List (GU Group Id List)

included in an X2 Setup Request message and in an X2 Setup Response message. This GU Group Id List is in the current standard an RBS level information and corresponds to a list of pool areas within the radio communications network to which the radio base station belongs to. However, with the present solution in mind the GU group Id List information element may be specified for each cell instead.

In the example, a first GU Group Id is indicated for the fourth cell 17 of RBS 12 in the X2 Setup Request message towards RBS 13, that is, the GU Group Id for the second MME 11, and another GU Group Id for cells 14-16, that is, the GU Group Id for MME 10. This would be so that the RBS 13 will know that it may only perform X2 Handover towards cell 17 that has the GU group Id of the second MME 11; handover towards the other cells 14-16 will use the S1-AP protocol since a change of the MME 11 to MME 10 is needed at such handover.

Figure 3:
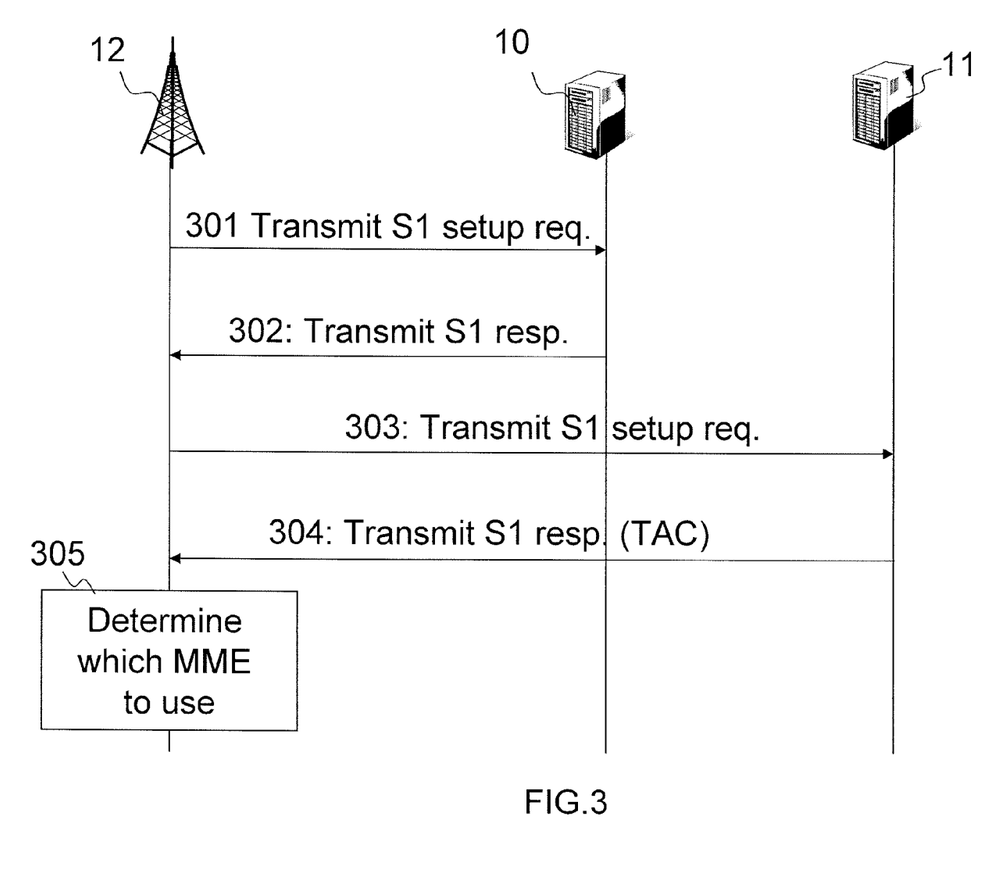
FIG. 3 is a schematic combined flow and signalling scheme within a radio communications network.

FIG. 3 shows a combined flowchart and signalling scheme of a method according to embodiments of the present solution. The radio base station 12 is to setup the S1 interface to the first MME 10 and the second MME 11. The signalling is performed in the cell configuration according to FIG. 2 wherein the second MME 11 controls the fourth cell 17 of the radio base station 12 and the first MME 10 controls the first to third cell. Hence, cells of the radio base station 12 are controlled by different MMEs.

Step 301. The radio base station 12 transmits an S1 Setup Request message to the first MME 10 comprising the tracking area codes known from a configuration setup from an operator, the OSS, neighbouring radio base station, reported from a UE or the like.

Step 302. The first MME 10 then responds to the S1 Setup Request message with an S1 Setup Response message comprising supported TACs. In the illustrated example, the S1 Setup Response message comprises an indication that the supported TACs are TAC 1 and TAC 2.

Step 303. The radio base station 12 transmits an S1 Setup Request message to the second MME 11 comprising the tracking area known from a configuration setup from an operator, the OSS, neighbouring radio base station, reported from a UE or the like.

Step 304. The second MME 11 then respond to the S1 Setup Request message with an S1 Setup Response message comprising supported TACs. In the illustrated example, the S1 Setup Response message comprises an indication that the supported TACs are TAC 3 and TAC 4.

Step 305. As the response messages from the first MME 10 and the second MME 11 indicate supported TACs, the radio base station 12 may then determine and store which S1-AP signaling connection relates to which TAC and hence signaling is made more efficient reducing communication between the MMEs 10 and 11.

Figure 4:
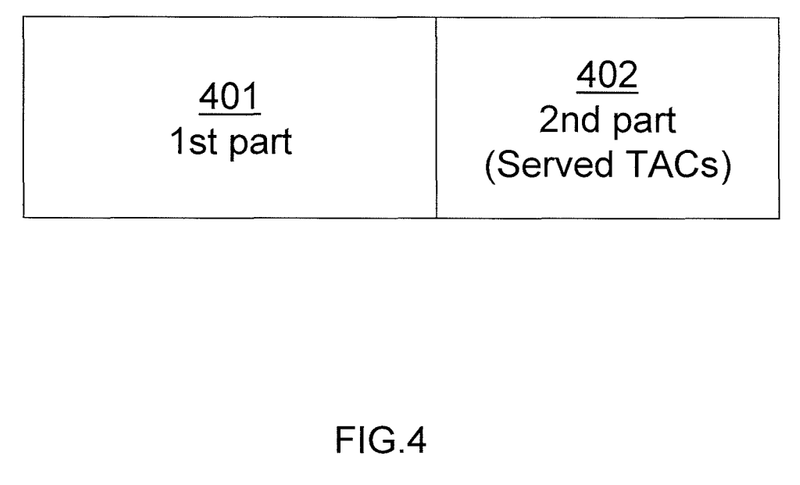
FIG. 4 is a schematic block diagram depicting an S1 Setup Response message message.

FIG. 4 is a schematic block diagram depicting an S1 Setup Response message from the Mobility Management Entity 11. The S1 Setup Response message comprises a first part 401 comprising for example a header indicating message type, MME name, PLMN supported and/or the like. Furthermore, the S1 Setup Response message comprises a second part 402 comprising supported TACs. Hence, the receiver of the S1 Setup Response message will be able to determine which TACs relates to the setup S1.

It should here be noted that the indication of supported TACs may be comprised wherever in the S1 Setup Response message. Other indications of TAC may be used, such as, tracking area indicator (TAI) which is used to identify tracking areas. The TAI is constructed from the PLMN identity the tracking area belongs to and the TAC of the tracking Area.

Figure 5:
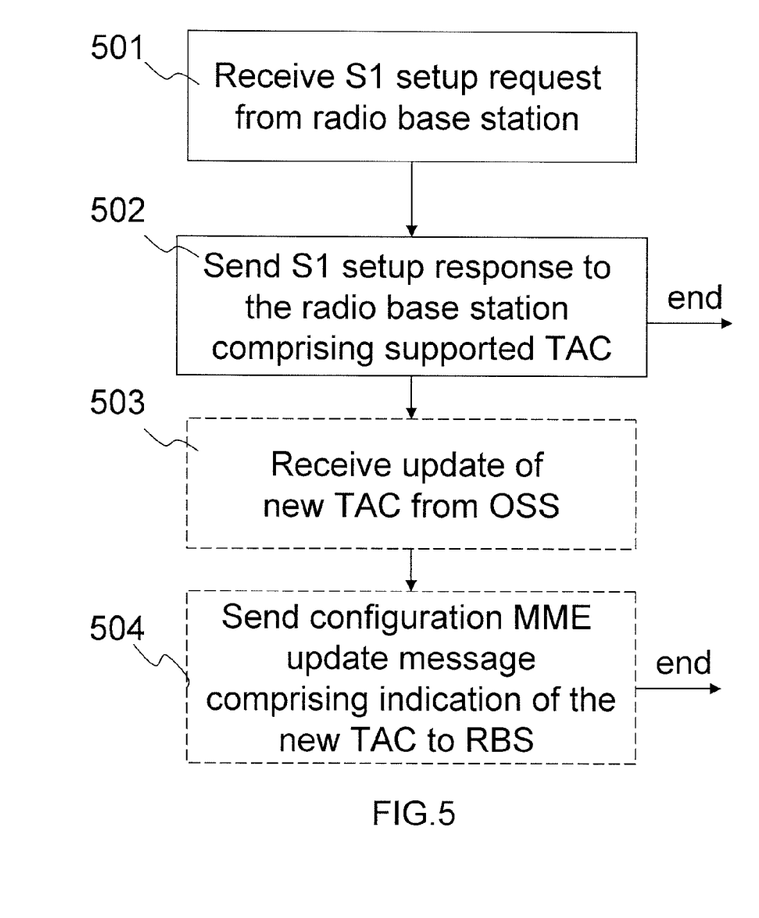
FIG. 5 is a schematic flow chart of a method in a Mobility Management Entity.

The method steps in the radio base station, referred to as the first radio base station 12 in the figures, for enabling signalling between the first radio base station 12 and the Mobility Management Entity 10,11 in a Long Term Evolution radio communications network, according to some embodiments will now be described with reference to a flowchart depicted in FIG. 5. The steps do not have to be taken in the order stated below, but may be taken in any suitable order.

The Mobility Management Entity 10,11 may be comprised in a pool of Mobility Management Entities.

Step 501

The Mobility Management Entity 10,11 receives an S1 Setup Request message from the first radio base station 12.

Step 502

The Mobility Management Entity 10,11 send an S1 Setup Response message to the first radio base station 12 enabling the first radio base station 12 to handle the setup of the S1 Application Protocol signalling connection. The S1 Setup Response message comprises an indication of at least one supported tracking area code of a tracking area, which tracking area is served by the Mobility Management Entity 10,11.

Step 503

This step is optional as indicated with the dashed line. The Mobility Management Entity 10,11 may receive a tracking area code update message from an operational support system node comprising an allocation of a new tracking area code to the Mobility Management Entity 10,11. The new tracking area code is different from the at least one tracking area code. This may also be received from the first radio base station 12, a DNS node or the like.

Step 504

This step is optional as indicated with the dashed line. As the Mobility Management Entity 10,11 have received the new tracking area code the Mobility Management Entity 10,11 sends a Mobility Management Entity Configuration Update message to the first radio base station 12. The Mobility Management Entity Configuration Update message then comprises an indication of the new tracking area code served by the Mobility Management Entity 10,11.

It should be noted that in some embodiments the Mobility Management Entity 10,11 may be defined as a second Mobility Management Entity 11. The second Mobility Management Entity 11 serves a second radio base station 13 in a second area A2 of the Long Term Evolution radio communications network. The first radio base station 12 is served by a first Mobility Management Entity 10 in a first area A1 of the Long Term Evolution radio communications network. The second Mobility Management Entity 11 is different than the first Mobility Management Entity 10 and may also be of different pools of Mobility Management Entities.

Figure 6:
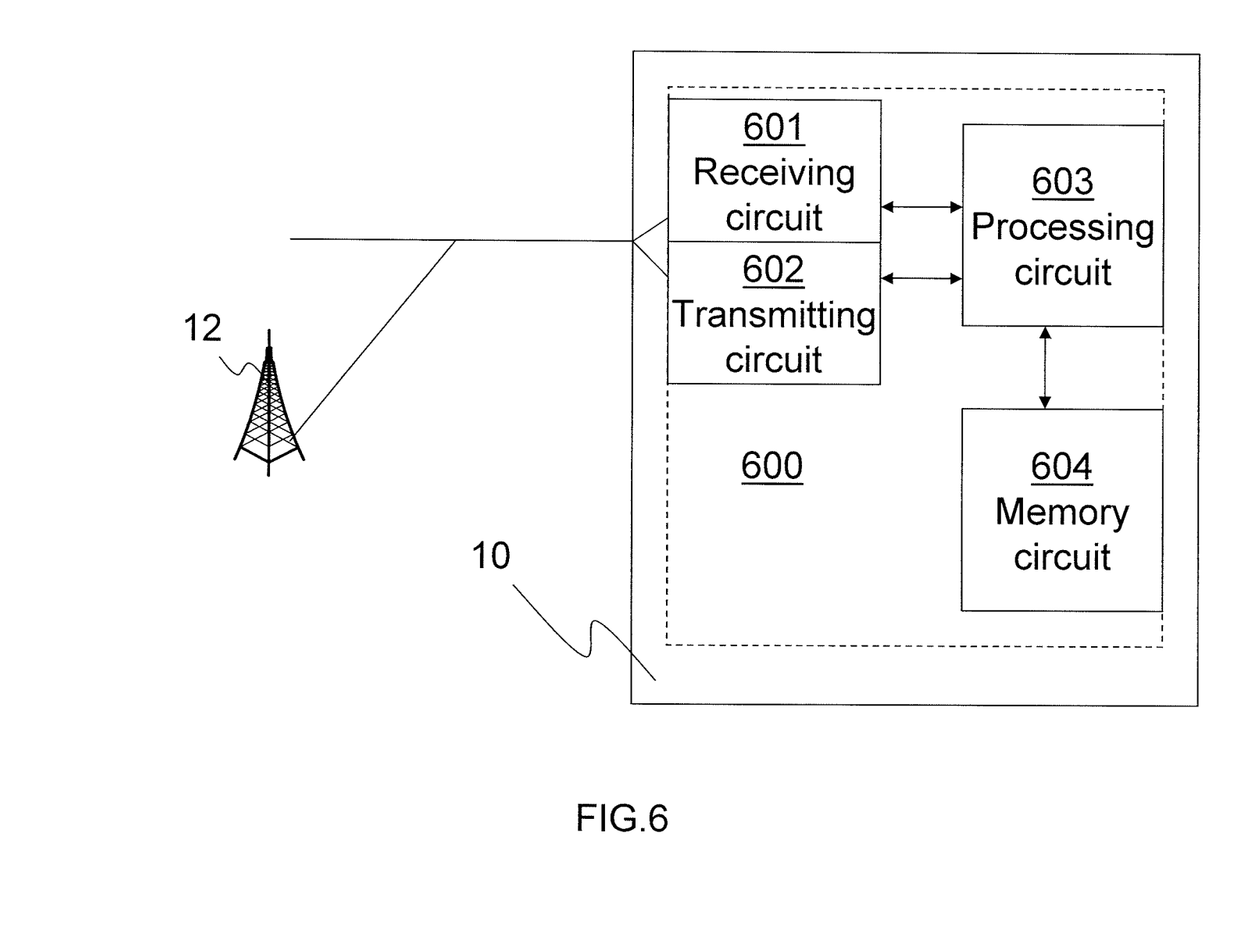
FIG. 6 is a schematic block diagram depicting a Mobility Management Entity.

In order to perform the method an arrangement 600 in the Mobility Management Entity 10,11 is provided as disclosed in FIG. 6. The arrangement 600 comprises a receiving circuit 601 arranged to receive an S1 Setup Request message from the first radio base station 12. Furthermore, the arrangement 600 comprises a sending circuit 602 coupled to the receiving circuit 601 and arranged to send the S1 Setup Response message to the first radio base station 12. The S1 Setup Response message comprises an indication of the at least one supported tracking area code of the tracking area, and the tracking area is served by the Mobility Management Entity 10,11. The S1 Setup Response message enables the first radio base station 12 to handle the setup of the S1 Application Protocol signalling connection.

The arrangement 600 may further comprise a processing circuit 603 arranged to retrieve the supported tracking area code from a memory unit 604.

Additionally, the receiving circuit 601 may further be arranged to receive a tracking area code update message from an operational support system node comprising an allocation of a new tracking area code to the Mobility Management Entity. The new tracking area code is different from the at least one tracking area code.

The sending circuit 602 may then optionally be arranged, as the Mobility Management Entity 10,11 have received the new tracking area code the Mobility Management Entity 10,11, to send a Mobility Management Entity Configuration Update message to the first radio base station 12. The Mobility Management Entity Configuration Update message then comprises an indication of the new tracking area code served by the Mobility Management Entity 10,11

Figure 7:
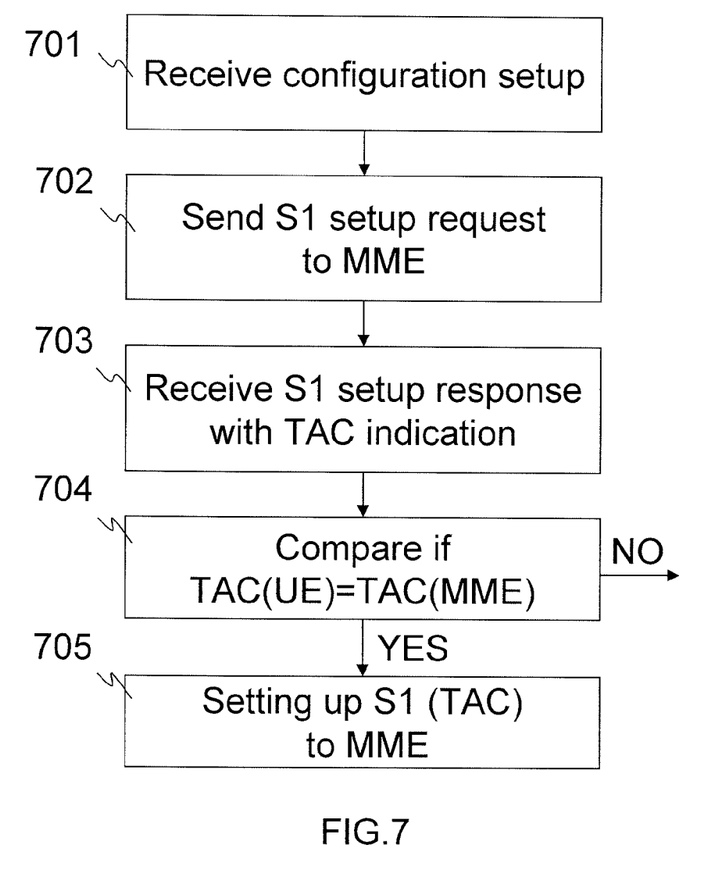
FIG. 7 is a schematic flow chart of a method in a radio base station.

The method steps in the radio base station, referred to as the first radio base station 12 in the figures, for enabling signalling between a radio base station 12 and the Mobility Management Entity 10,11 in a Long Term Evolution radio communications network according to some general embodiments will now be described with reference to a flowchart depicted in FIG. 7. The steps do not have to be taken in the order stated below, but may be taken in any suitable order.

Step 701

The first radio base station 12 receives a configuration setup of a first tracking area code of a cell 17,18 of the radio communications network 100, for example, TAC1, TAC2, TAC3, or TAC4. The configuration setup may be from, for example, an operator, an operation support system, an indication from a different radio base station or from a user equipment 23 present within the cell 17,18 of the radio communications network 100

Step 702

The first radio base station 12 sends the S1 Setup Request message to the Mobility Management Entity 10,11, which message comprises the first tracking area code.

Step 703

The first radio base station 12 receives the S1 Setup Response message from the Mobility Management Entity 10,11. The S1 Setup Response message, as stated above, comprises an indication of at least one supported tracking area code of a tracking area. The tracking area is served by the Mobility Management Entity 10,11 and the S1 Setup Request message enables the first radio base station 12 to handle the setup of the S1 Application Protocol signalling connection.

Step 704

The first radio base station 12 compares the first tracking area code with the at least one supported tracking area code.

Step 705

If the first tracking area code matches the at least one supported tracking area code, the first radio base station 12 sets up the S1 Application Protocol signalling connection towards the Mobility Management Entity 10,11. Otherwise, the first radio base station 12 may consider the response to be a rejection of the request and no S1 Application Protocol signalling connection is set up.

Figure 8:
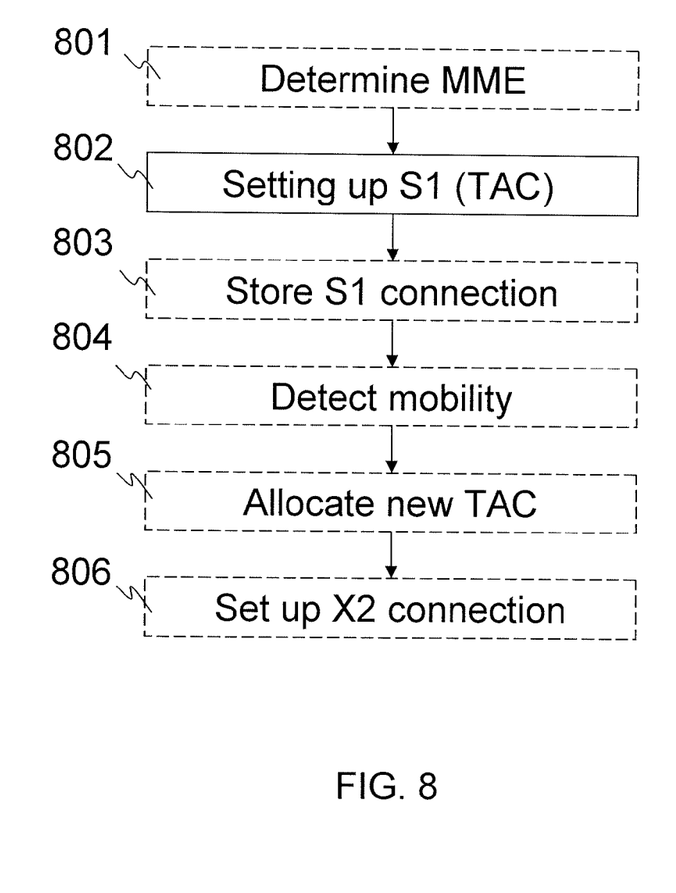
FIG. 8 is a schematic flow chart of further embodiments of a method in a radio base station.

The method steps in the first radio base station 12 for enabling signalling between a radio base station 12 and the Mobility Management Entity 10,11 in a Long Term Evolution radio communications network according to some further embodiments will now be described with reference to a flowchart depicted in FIG. 8. The steps do not have to be taken in the order stated below, but may be taken in any suitable order.

Step 801

This is an optional step as indicated by the dashed line. The first radio base station 12 determines towards which Mobility Management Entity 10,11 the first radio base station 12 may setup the S1 Application Protocol signalling connection. This may be based from configuration by an Operational Support System node or by requesting a Domain Name Server node with the first tracking area code.

Step 802

The first radio base station 12 sets up an S1 Application signalling connection to the Mobility Management Entity. This step corresponds to the steps 701-705 in FIG. 7.

Step 803

This is an optional step as indicated by the dashed line. The first radio base station 12 stores information that the Mobility Management Entity 10,11 supports the at least one supported tracking area code for future communication.

The first radio base station 12 may in some embodiments serve a first cell of a second tracking area code, for example, TAC 2, and the first tracking area code, for example, TAC3, is allocated to a second cell 18 controlled by a second radio base station 13.

Step 804

This is an optional step as indicated by the dashed line. In some embodiments, the first cell 17 comprises a number of user equipments and the second tracking area code is allocated to the first cell 17. The first radio base station 12 may then detect an amount of mobility of the user equipments towards the second cell 18 served by the second radio base station 13. The second cell 18, as stated above, has the first tracking area code allocated to it. The first radio base station 12 detects the mobility by handling handover procedures of the user equipments between the first and second cell.

Step 805

This is an optional step as indicated by the dashed line. The first radio base station 12 may then allocate the first tracking area code of the second cell 18 to the first cell 17 when the amount has exceeded a set threshold value.

Step 806

This is an optional step as indicated by the dashed line. The first radio base station 12 may set up an X2 Application Protocol signaling connection to the second radio base station 13 by sending an X2 Setup Request to the second radio base station 13. The X2 Setup Request comprises a Global Unique Group Identity List associated to the cell identity of the first cell.

Figure 9:
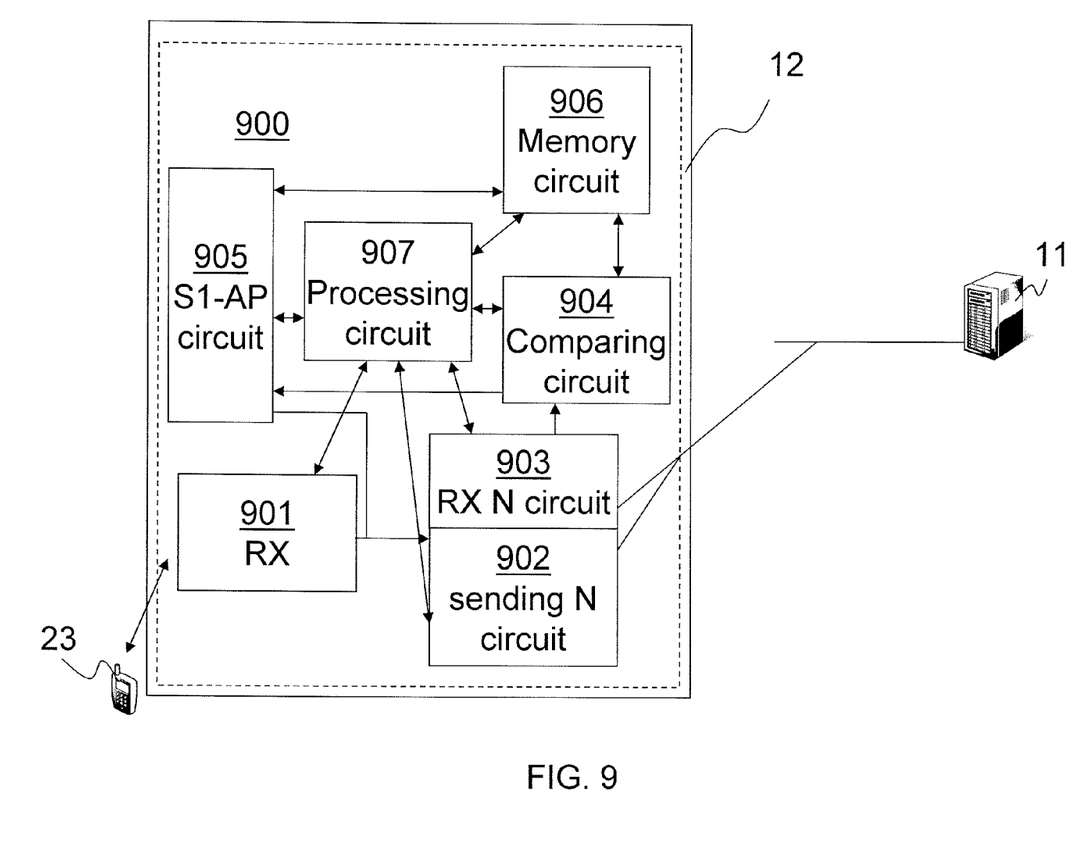
FIG. 9 is a schematic block diagram depicting a radio base station.

In order to perform the method an arrangement 900 in the first radio base station 12 is provided as shown in FIG. 9. The arrangement 900 comprises a receiving circuit 901 arranged to receive a configuration setup, for example, from an operator, an operational support system, or a user equipment, indicating a first tracking area code of a cell in the radio communications network 100. The arrangement 900 thereby detects the first tracking area code. Furthermore, the arrangement 900 comprises a sending network circuit 902 coupled to the receiving arrangement 901 and arranged to send the S1 Setup Request message to the Mobility Management Entity 10,11 comprising the first tracking area code. The arrangement 900 also comprises a receiving network circuit 903 arranged to receive an S1 Setup Response message from the Mobility Management Entity 10,11, which S1 Setup Response message comprises an indication of at least one supported tracking area code of a tracking area. The tracking area is served by the Mobility Management Entity 10,11 and the S1 Setup Request message enables the first radio base station 12 to handle the setup of the S1 Application Protocol signalling connection.

The arrangement 900 further comprises a comparing circuit 904 coupled to the receiving network circuit 903 and arranged to compare the first tracking area code with the at least one supported tracking area code. The arrangement 900 in addition comprises an S1 Application Protocol circuit 905 arranged, if the first tracking area code matches the at least one supported tracking area code, to set up the signalling connection towards the Mobility Management Entity 10,11.

The arrangement 900 may further comprise a memory circuit 906 configured to store information that the Mobility Management Entity 10,11 supports the at least one supported tracking area code for future communication. The memory circuit 906 may comprise one or more applications that when run on a processor the arrangement 900 performs the method.

As stated above, the first radio base station 12 may serve a first cell 17 of a second tracking area code and wherein the first tracking area code is allocated to a second cell 18 controlled by a second radio base station 13.

The first cell 17 may comprise a number of user equipments and which first cell 17 comprises the second tracking area code. The arrangement 900 may then comprise a detecting circuit configured to detect an amount of mobility of the user equipments towards the second cell 18 served by the second radio base station 13. The second cell 18 comprises the first tracking area code. The detecting circuit detects the mobility by handling handover procedures of the user equipments between the first and second cell.

Also, the arrangement 900 may comprise an allocating circuit configured to allocate the first tracking area code of the second cell 18 to the first cell (17) when the amount has exceeded a set threshold value.

The arrangement may also comprise a set up circuit arranged to set up an X2 Application Protocol signaling connection to the second radio base station 13. This may be performed by sending an X2 Setup Request to the second radio base station 13 the X2 Setup Request comprises a Global Unique Group Identity List associated to the cell identity of the first cell.

The arrangement 900 may further comprises a determining circuit arranged to determine towards which Mobility Management Entity 10,11 to setup the S1 Application Protocol signalling connection from configuration by an Operational Support System node or by requesting a Domain Name Server node with the first tracking area code.

The present mechanism for enabling signalling between the radio base station 12 and the Mobility Management Entity 10,11 in the Long Term Evolution radio communications network may be implemented through one or more processors, such as the processing circuit 603 in the MME 10,11 depicted in FIG. 6 or such as a processor 907 in the first radio base station 12 depicted in FIG. 9, together with computer program code for performing the functions of the present solution. The program code mentioned above may also be provided as a computer program product, for instance in the form of a data carrier carrying computer program code for performing the present solution when being loaded into the MME 10,11 or the first radio base station 12. One such carrier may be in the form of a CD ROM disc. It is however feasible with other data carriers such as a memory stick. The computer program code may furthermore be provided as pure program code on a server and downloaded to the MME 10,11 or the first radio base station 12.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method in a Mobility Management Entity for handling a setup of an S1 Application Protocol signalling connection between a first radio base station and the Mobility Management Entity in a Long Term Evolution radio communications network, said method comprising:
   receiving an S1 Setup Request message from the first radio base station; and
   sending an S1 Setup Response message to the first radio base station, said S1 Setup Response message comprising an indication of at least one supported tracking area code of a tracking area that is served by the Mobility Management Entity, and said S1 Setup Response message enabling the first radio base station to handle the setup of the S1 Application Protocol signalling connection.

2. The method of claim 1, wherein the Mobility Management Entity is comprised in a pool of Mobility Management Entities.

3. The method of claim 1, wherein the Mobility Management Entity is defined as a second Mobility Management Entity and serves a second radio base station in a second area of the Long Term Evolution radio communications network, and wherein the first radio base station is served by a another, first Mobility Management Entity in a first area of the Long Term Evolution radio communications network.

4. The method of claim 1, further comprising:
   receiving a tracking area code update message from an operational support system node, which message comprises an allocation of a new tracking area code to the Mobility Management Entity, which new tracking area code is different from the at least one tracking area code; and
   sending a Mobility Management Entity Configuration Update message to the first radio base station, which Mobility Management Entity Configuration Update message comprises an indication of the new tracking area code served by the Mobility Management Entity.

5. A method in a first radio base station for handling a setup of an S1 Application Protocol signalling connection between the first radio base station and a Mobility Management Entity in a Long Term Evolution radio communications network, said method comprising:
   receiving a configuration setup indicating a first tracking area code of a cell in the radio communications network;
   sending an S1 Setup Request message to the Mobility Management Entity comprising the first tracking area code;
   receiving an S1 Setup Response message from the Mobility Management Entity, which S1 Setup Response message comprises an indication of at least one supported tracking area code of a tracking area served by the Mobility Management Entity, said S1 Setup Request message enabling the first radio base station to handle the setup of an S1 Application Protocol signalling connection towards the Mobility Management Entity;
   comparing the first tracking area code with the at least one supported tracking area code; and
   if the first tracking area code matches the at least one supported tracking area code, setting up the S1 Application Protocol signalling connection towards the Mobility Management Entity.

6. The method of claim 5, further comprising storing information that the Mobility Management Entity supports the at least one supported tracking area code for future communication.

7. The method of claim 5, wherein the first radio base station serves a first cell of a second tracking area code and wherein the first tracking area code is allocated to a second cell controlled by a second radio base station.

8. The method of claim 7, wherein the first cell serves a number of user equipments and is associated with the second tracking area code, and said method further comprises:
  detecting an amount of mobility of the user equipments towards the second cell served by the second radio base station, by handling handover procedures of the user equipments between the first and second cells, wherein the second cell is associated with the first tracking area code; and
  allocating the first tracking area code of the second cell to the first cell in response to the amount exceeding a set threshold value.

9. The method of claim 8, further comprising setting up an X2 Application Protocol signaling connection to the second radio base station by sending an X2 Setup Request to the second radio base station the X2 Setup Request comprises a Global Unique Group Identity List associated to the cell identity of the first cell.

10. The method of claim 5, further comprising determining towards which Mobility Management Entity to setup the S1 Application Protocol signalling connection from configuration by an Operational Support System node, or by requesting a Domain Name Server node with the first tracking area code.

11. An arrangement for handling a setup of an S1 Application Protocol signalling connection between a first radio base station and a Mobility Management Entity in a Long Term Evolution radio communications network, said arrangement being in the Mobility Management Entity and comprising:
  a receiving circuit configured to receive an S1 Setup Request message from the first radio base station; and
  a sending circuit configured to send an S1 Setup Response message to the first radio base station, said S1 Setup Response message indicating at least one supported tracking area code of a tracking area served by the Mobility Management Entity, said S1 Setup Response message enabling the first radio base station to handle the setup of the S1 Application Protocol signalling connection towards the Mobility Management Entity.

12. An arrangement for handling a setup of an S1 Application Protocol signalling connection between a first radio base station and a Mobility Management Entity in a Long Term Evolution radio communications network, said arrangement being in the first base station and comprising:
  a receiving circuit configured to receive a configuration setup indicating a first tracking area code of a cell in the Long Term Evolution radio communications network;
  a sending network circuit configured to send an S1 Setup Request message to the Mobility Management Entity indicating the first tracking area code;
  a receiving network circuit configured to receive an S1 Setup Response message from the Mobility Management Entity that indicates at least one supported tracking area code of a tracking area served by the Mobility Management Entity, wherein the S1 Setup Request message enables the first radio base station to handle the setup of the S1 Application Protocol signalling connection towards the Mobility Management Entity;
  a comparing circuit configured to compare the first tracking area code with the at least one supported tracking area code; and
  an S1 Application Protocol circuit configured to set up the S1 Application Protocol signalling connection towards the Mobility Management Entity in response to the first tracking area code matching the at least one supported tracking area code.

* * * * *